Dec. 18, 1956  A. M. MacCALLUM  2,774,559
POSITIONING SYSTEM MONITOR
Filed Dec. 15, 1949
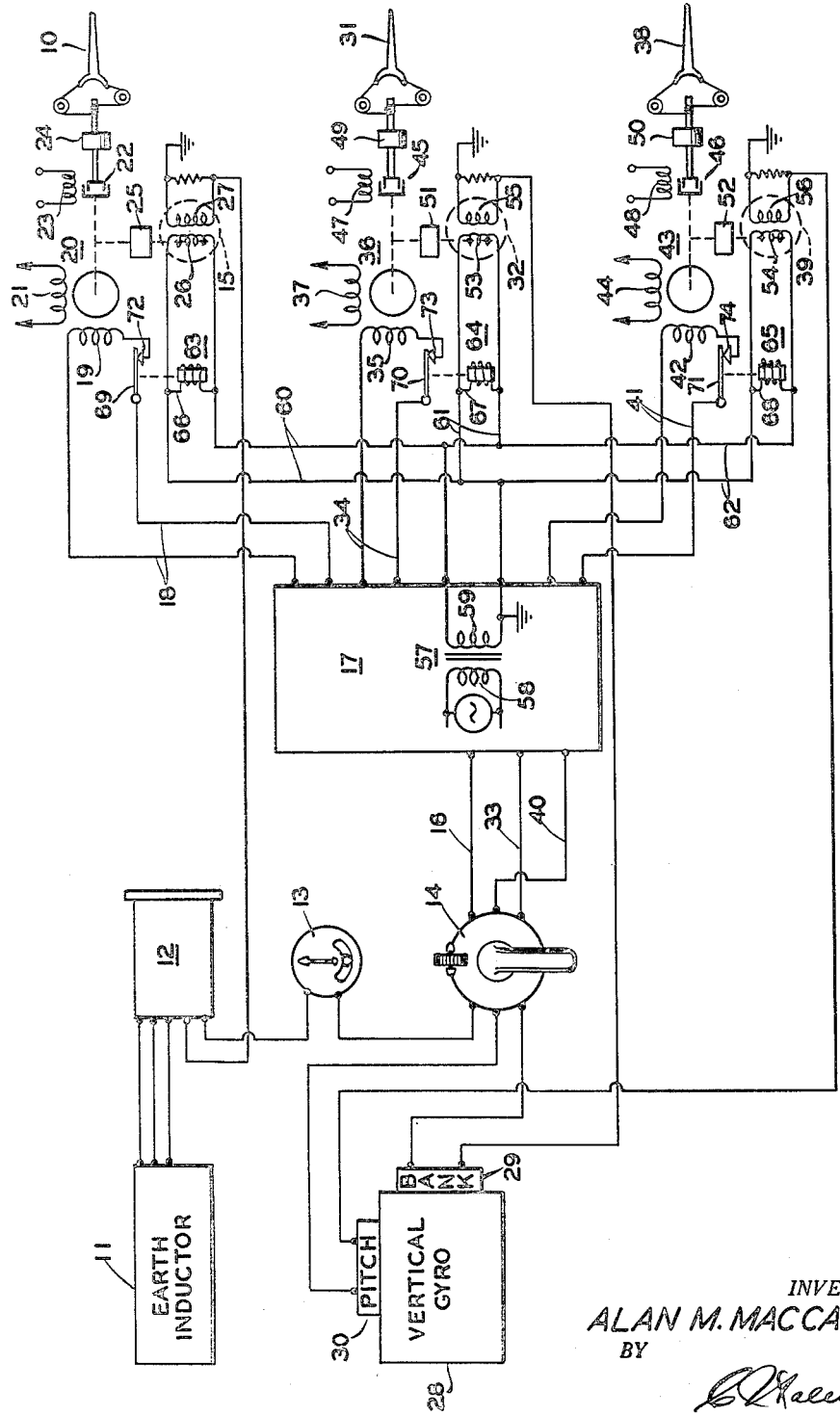
INVENTOR.
ALAN M. MacCALLUM
BY
*ATTORNEY*

United States Patent Office 2,774,559
Patented Dec. 18, 1956

2,774,559

POSITIONING SYSTEM MONITOR

Alan M. MacCallum, Maywood, N. J., assignor to Bendix Aviation Corporation, Teterboro, N. J., a corporation of Delaware Application December 15, 1949, Serial No. 133,043

2 Claims. (Cl. 244—77)

The present invention relates generally to safety or monitoring apparatus and more particularly to apparatus of this general character adapted for preventing improper control of an aircraft by an automatic pilot system due to loss of follow-up in one or more of the control channels of the system.

All electric automatic pilot systems for aircraft currently in use generally comprise a three channel control arrangement, each channel, in turn, generally consisting of a displacement and trim signal generator for controlling a surface servo motor together with an electric follow-up signal generator for modifying the operation of the motor. In such arrangements that have been designed as closed loop systems, loss of electric follow-up will result in the control surface being operated in such a manner as to cause the craft to oscillate undesirably about a predetermined flight position. Because of the complexity of such systems failures are apt to occur, one such source of possible failure being loss of follow-up.

Electric follow-ups utilized in the foregoing systems generally comprise two-part inductive devices in the form of variable transformers or signal generators having one of their parts acting as energized primaries and the other parts thereof acting as secondaries having signals developed therein of a magnitude and phase dependent upon the amount and direction of relative angular displacement of the parts. If, for some reason, loss of voltage occurs at the primary, for example, no follow-up signal will be available at the secondary and the present invention contemplates the provision of novel apparatus whereby in response to loss of follow-up the power supply to one or more of the servo motors is interrupted automatically to thereby prevent improper surface control by the automatic pilot.

An object of the present invention, therefore, is to provide a novel safety arrangement for monitoring the operation of an aircraft automatic pilot.

Another object of the invention is to provide a novel monitoring arrangement for an aircraft automatic pilot which in response to loss of follow-up will disable automatically one or more of the servo motors of the pilot thereby making the motors ineffective on their related control surfaces.

A further object is to provide in a positioning system utilizing a motor for operating a controlled member and a follow-up member for modifying the operation of the motor, novel and automatically operable means responsive to loss of follow-up for disabling the motor from operating the controlled member.

Another and further object of the invention is to provide novel safety means in all three channels of a three axes of control aircraft automatic pilot which, in response to loss of voltage in the follow-ups of the pilot, will operate to disable one or more servo motors of the pilot from operating the related control surfaces.

The above and other objects and advantages of the invention will appear more fully hereinafter from a consideration of the detailed description which follows when taken together with the accompanying drawing wherein one embodiment of the invention is illustrated. It is to be expressly understood, however, that the drawing is for the purpose of illustration and description only and is not designed as a definition of the limits of the invention.

The single figure of the drawing is a diagrammatic illustration of one embodiment of the novel safety apparatus of the present invention for monitoring the operation of an aircraft automatic pilot.

Referring now to the single figure of the drawing for a more detailed description of the novel safety arrangement of the present invention, the latter is shown as applied to a conventional all electric, three axes of control aircraft automatic pilot. As illustrated, such an automatic pilot generally comprises for the control of a rudder 10, a compass consisting of a stabilized earth inductor element 11 and a master direction indicator device 12 which receives and reproduces for control purposes the signals of element 11. In addition to the compass signal, rate of turn, course-turn and follow-up signals are developed by a rate of turn device 13, a turn signal generator incorporated in a manual turn control unit 14 and an inductive follow-up device 15.

The various signal generators are series connected with each other and by way of a conductor 16 with the input of the rudder channel of an amplifier 17, the output of which is fed by way of leads 18 to the variable phase winding 19 of a two-phase induction motor 20 whose second phase winding 21 is connected with a suitable source of current. Motor 20 drivably connects through an electromagnetic clutch 22, having a control winding 23, and a gear reduction mechanism 24 with the rudder surface and through a gear reduction mechanism 25 with the wound rotor 26 of inductive follow-up device 15, whose stator winding 27 is fixed with respect to the craft.

For controlling the craft in bank and pitch a vertical gyro 28 is provided having bank and pitch take-offs 29 and 30. For control of aileron surface 31, bank, follow-up and bank trim signals are provided by bank take-off 29, inductive follow-up device 32 and a bank trim signal generator, incorporated in turn control unit 14. The various signals of the bank channel are series connected with each other and by way of a conductor 33 with the input of the aileron channel of the amplifier, the output of which connects by way of leads 34 with the variable phase winding 35 of a two-phase induction motor 36, whose second phase winding 37 is connected with a suitable source of current.

For control of elevator surface 38, on the other hand, pitch, follow-up and pitch trim signals are provided by pitch take-off 30, inductive follow-up device 39 and a pitch trim signal generator incorporated in turn control unit 14. These signals, like those of the rudder and aileron channels, are series connected with each other and by way of a conductor 40 with the input of the elevator channel of the amplifier, the ouput of which connects by way of leads 41 with the variable phase winding 42 of a two-phase induction motor 43, whose second phase winding 44 is connected with a suitable source of current.

Motors 36 and 43 drivably connect through electromagnetic clutches 45 and 46, having control windings 47 and 48, respectively, and gear reduction mechanisms 49 and 50 with aileron and elevator surfaces 31 and 38 and through gear reduction mechanisms 51 and 52 with wound rotors 53 and 54 of inductive follow-up devices 32 and 39, whose stator windings 55 and 56 are fixed with respect to the craft.

The source of excitation voltage for the rotors 26, 53 and 54 of inductive follow-up devices 15, 32 and 39 is defined by a transformer 57 having a primary winding 58 connected to a suitable source of A. C. supply and a grounded secondary winding 59, the rotors being connected in parallel with the secondary by way of leads 60, 61 and 62. Transformer 57, though it may be located at any desired point, is preferably shown as located within amplifier 17. Because of the latter location there must be of necessity considerable distance between the amplifier output and the various servo follow-up devices giving rise to vulnerability of the various leads interconnecting the amplifier output and the follow-up devices. In addition, in actual installation various disconnect plugs and distribution panels will be required in the connections between the amplifier output and the follow-up devices, all these factors giving rise to the possibility of loose connections and the development of shorts in the connections.

In accordance with the present invention, novel means are provided whereby in response to loss of follow-up resulting from loss of excitation voltage in the rotors of the follow-ups due to loose connections, shorts, etc., the servomotors are disabled automatically from operating their related control surfaces. To this end, relays 63, 64 and 65 are provided whose energizing windings 66, 67 and 68 are connected across leads 60, 61 and 62, respectively, whereby during normal voltage supply to rotors 26, 53 and 54 the relays are maintained in an energized condition. In their energized condition the relays maintain movable armatures 69, 70 and 71 in engagement with their related fixed contacts 72, 73 and 74, respectively. Armatures 69, 70 and 71 and their related fixed contacts 72, 73 and 74 are connected in the leads 18, 34 and 41, respectively, of the variable phase windings 19, 35 and 42 of servomotors 20, 36 and 43 so that engagement of the armatures and fixed contacts permits operation of the servomotors in accordance with the control signals communicated to the amplifier input.

In the event of loss of excitation voltage to any one or all of the rotors of follow-up devices 15, 32 and 39, one or all of relays 63, 64 and 65 will become de-energized whereupon one or all of the movable armatures 69, 70 and 71 will disengage their related contacts 72, 73 and 74 to thereby open the connection of the variable phase windings of the servomotors with the amplifier output. In this manner due to loss of follow-up resulting from loss of excitation voltage, the servomotor or motors are disabled automatically from controlling the related control surfaces.

Once the cause for loss of follow-up has been remedied and a normal excitation voltage is again supplied to the rotor or rotors of the inductive device or devices involved, the related relay becomes energized to re-establish the connection between the variable phase windings of the motors and the amplifier output. While the foregoing provision disables the motors only in response to a loss of excitation voltage to the follow-up devices, fuses may be inserted in the connection to the follow-up devices to de-energize the relays and thus disable the related motors in response to the presence of excessive voltages.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A positioning system having a motor for operating a controlled member in response to a control signal, follow-up means connected to the motor for preventing oscillation of the system, said means comprising a two-part inductive device for developing a follow-up signal, a source of excitation voltage for energizing one part of said device, and means connected with said device and said motor and responsive to loss of excitation voltage by said device for making the motor ineffective to said control signal.

2. An aircraft automatic pilot having servomotors for operating craft rudder, aileron and elevator surfaces, individual follow-up means operable by each of said motors for preventing oscillation of the aircraft, a source of excitation voltage for said follow-up means, and safety means connected with each of said follow-up means and responsive to loss of excitation voltage by said follow-up means for disabling a related servomotor.

References Cited in the file of this patent
UNITED STATES PATENTS

| | | |
|---|---|---|
| 1,436,280 | Minorsky | Nov. 21, 1922 |
| 1,568,972 | Hammond | Jan. 12, 1926 |
| 2,077,179 | Moseley et al. | Apr. 13, 1937 |
| 2,217,254 | Langgasser | Oct. 8, 1940 |
| 2,319,000 | Jones | May 11, 1943 |
| 2,470,820 | Hull | May 24, 1949 |
| 2,483,594 | Oliver | Oct. 4, 1949 |
| 2,487,793 | Esval | Nov. 15, 1949 |
| 2,634,391 | Rusler | Apr. 7, 1953 |

OTHER REFERENCES

Publication, "Smiths Controlled Flight System," by Smiths Aircraft Instruments Limited, Publication SA1/EP 108, published September 1948, pages 21, 33 and 318–489.